US006856449B2

(12) United States Patent
Winkler et al.

(10) Patent No.: US 6,856,449 B2
(45) Date of Patent: Feb. 15, 2005

(54) ULTRA-HIGH RESOLUTION LIGHT MODULATION CONTROL SYSTEM AND METHOD

(75) Inventors: Bret D. Winkler, South Jordan, UT (US); Dennis F. Elkins, Draper, UT (US); Allen H. Tanner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 7 days.

(21) Appl. No.: 10/617,145

(22) Filed: Jul. 10, 2003

(65) Prior Publication Data

US 2005/0007652 A1 Jan. 13, 2005

(51) Int. Cl.[7] .................................................. G02B 26/00
(52) U.S. Cl. ........................................ 359/298; 359/291
(58) Field of Search ................................. 359/298, 291, 359/223, 320, 584, 572; 345/108, 84

(56) References Cited

U.S. PATENT DOCUMENTS

| | | | | |
|---|---|---|---|---|
| 4,720,705 A | | 1/1988 | Gupta et al. | |
| 5,311,360 A | | 5/1994 | Bloom et al. | |
| 5,661,592 A | | 8/1997 | Bornstein et al. | |
| 5,677,783 A | | 10/1997 | Bloom et al. | |
| 5,835,256 A | | 11/1998 | Huibers | |
| 5,841,579 A | | 11/1998 | Bloom et al. | |
| 5,963,788 A | | 10/1999 | Barron et al. | |
| 6,147,789 A | | 11/2000 | Gelbart | |
| 6,215,579 B1 | | 4/2001 | Bloom et al. | |
| 6,219,015 B1 | | 4/2001 | Bloom et al. | |
| 6,298,066 B1 | | 10/2001 | Wettroth et al. | |
| 6,388,241 B1 | * | 5/2002 | Ang | 250/208.1 |
| 6,445,433 B1 | | 9/2002 | Levola | |
| 6,529,310 B1 | | 3/2003 | Huibers et al. | |
| 6,549,196 B1 | | 4/2003 | Taguchi et al. | |
| 6,741,384 B1 | * | 5/2004 | Martin et al. | 359/291 |

* cited by examiner

*Primary Examiner*—Georgia Epps
*Assistant Examiner*—Richard Hanig
(74) *Attorney, Agent, or Firm*—Thorpe North & Western

(57) ABSTRACT

A microscopic optical structure controller for providing singular control of individual microscopic optical structures of a microelectromechanical optical device by a multiplexed stream of individual pixel values generated by a pixel value source. The microscopic optical structure controller includes at least one interconnect coupled to the pixel value source for receiving the multiplexed stream of individual pixel values and at least one mapper communicating with the interconnect for extracting individual pixel values from the multiplexed stream and applying the individual pixel values to one or more individual microscopic optical structures according to a configurable mapping. A method and a driver for providing singular control of individual microscopic optical structures of a microelectromechanical optical device are also disclosed.

31 Claims, 9 Drawing Sheets

ULTRA-HIGH RESOLUTION LIGHT MODULATION CONTROL SYSTEM AND METHOD

BACKGROUND OF THE INVENTION

1. Field of the Invention

The present invention relates generally to spatial light modulators. More particularly, the present invention relates to improved resolution in microelectromechanical optical devices.

2. Related Art

Spatial light modulators (SLM) have found use in a variety of applications, including their use in image displays. Of particular interest are SLM manufactured using microelectromechanical systems technology (MEMS), such as a grating light valve (GLV) or digital mirror device (DMD). Operation of MEMS optical devices is similar, relying on mechanical deflection of microscopic optical structures fabricated on the device to reflect or diffract impinging light.

For example, a grating light valve (GLV) can be used to modulate light intensity to implement a display as disclosed in U.S. Pat. No. 6,215,579 issued to Bloom et. al. The GLV is used to modulate light intensity by electrostatic deflection of long thin microscopic optical structures ("ribbons") to create a diffraction grating. The electrostatic deflection is accomplished by applying a control voltage to the ribbon. Typically, half the ribbons remain in a fixed position, and the other half are deflected by distances of less than one quarter of a wavelength of the incident light by applying a voltage to the ribbons. The more the deflection, the deeper the diffraction grating, and hence the more light is diffracted.

A two dimensional display may be produced by reflecting a beam of light from the GLV and sweeping the beam across the display. To create a pixel, a voltage proportional to the desired pixel value is applied to half the ribbons corresponding to the pixel (while the other half of the ribbons are fixed in position). A vertical column of pixels is generated by the GLV, and the pixel intensity is modulated as the beam is swept across the display horizontally to produce a two dimensional array of pixels. Each pixel is thus defined by GLV ribbons in the vertical dimension, and by the pixel time in the horizontal dimension. The pixel time and horizontal scan rate determine the horizontal pixel-width of the display. Alternatively, the GLV may be used to produce a row of pixels which is modulated as it is swept across the display vertically. For purposes of this discussion, it will be assumed that horizontal scanning is used for convenience of illustration and should not be considered limiting.

The vertical resolution of a display produced by a GLV is determined by the number of ribbons and how they are combined to produce pixels. For example, Bloom discloses the use of 1920 ribbons, configured 6 per pixel to produce a 320-pixel display. A minimum of two ribbons per pixel is typically required, since the diffraction grating is produced by alternating fixed ribbons with deflecting ribbons. Fixed ("reference") ribbons are tied to a bias voltage (typically ground), and deflecting ("active") ribbons are deflected by the application of a ribbon control voltage. As noted by Bloom, different assignment of ribbons to pixels is possible, e.g. using 2, 4, 8, 10, or 12 ribbons per pixel. This assignment is defined by the electrical interconnection on the integrated circuit substrate, and is fixed at manufacturing time.

Maximum resolution of a GLV can be obtained by connecting each ribbon pair to a separate interconnect pin. Such an approach is impractical for a high-resolution display, however, because a large number of interconnects would be required. Practical packages are limited to 200–300 pins, far less than the 3000 or so ribbons typically provided by a GLV. Furthermore, a significant cost component of a packaged GLV is the many bond wires that are required to connect the GLV ribbons to the package pins.

Operation of a GLV can be in either a linear (analog) or non-linear (digital) mode. The non-linear (digital) mode of operation disclosed in U.S. Pat. No. 5,311,360 issued to Bloom et. al. makes use of a hysteresis effect that causes ribbons to latch in a down position when a sufficiently high ribbon control voltage is applied to the ribbon. Although operation in this mode provides some advantages in low power consumption and simplified interface, it limits the ability to provide gray scale control of intensity. To provide gray scale operation, a binary encoding scheme is disclosed in U.S. Pat. No. 5,677,783 issued to Bloom et. al. which uses 30 ribbons, grouped as 1 pair, 2 pairs, 4 pairs, and 8 pairs where each group is controlled separately to provide 4-bit (16-level) gray scale control. This scheme, however, suffers from several limitations; the large number of ribbons per pixel required results in low resolution, and the trade-off between gray-scale resolution and pixel resolution is fixed at manufacturing time.

The linear (analog) mode of operation disclosed in U.S. Pat. No. 6,215,579 limits the amount of deflection of the ribbons to a small amount, such that the deflection is roughly proportional to the applied voltage. This approach allows direct control of gray-scale values by applying an analog voltage directly to the groups of ribbons forming a pixel, but still suffers from the limitation that the assignment of ribbons to form a pixel must be fixed at manufacturing time.

A row-column addressing scheme to reduce the number of interconnects required in a large pixel display is disclosed in U.S. Pat. No. 5,841,579, issued to Bloom et. al. The row-column addressing scheme disclosed, however, is only applicable to a GLV operated in the non-linear (digital) mode since it relies on the hysteresis property that the ribbon will snap to the fully deflected position if a voltage exceeding a threshold is applied. In the row-column addressing scheme, half the required threshold voltage is applied to the row and half to the column corresponding to an addressed pixel. Only the addressed pixel will have the full voltage applied (and snap to the deflected position); all other pixels in the row and column will deflect only slightly. This slight deflection of the non-addressed pixels can result in some reduction in the contrast of the display, as noted by Bloom. Unfortunately, such a row-column addressing scheme is difficult in a GLV operated in a linear (analog) mode. In the linear mode, the ribbon deflection is proportional to the applied voltage, and the row-column addressing scheme would result in unacceptable crosstalk between pixels in the same row or column.

Providing sub-pixel resolution in displays has not heretofore been possible. Sub-pixel resolution can be simulated in displays using the technique disclosed in U.S. Pat. No. 4,720,705 issued to Gupta et. al. where adjacent pixel gray-scale values are altered to simulate sub-pixel placement of edges. Although this technique can improve the apparent resolution for some applications (e.g. text display), it is inappropriate for other applications that require bright objects to be placed precisely (e.g. lights in a simulator).

Finally, when projecting images onto non-planer surfaces, image distortion occurs. Correction of this distortion can be implemented without complex optical lenses by non-linear image mapping, e.g. by electronically adjusting the displayed pixels to compensate for the distortion as disclosed in U.S. Pat. No. 5,850,225 issued to Cosman. Electronic compensation approaches suffer from significant complexity due the intense processing required.

SUMMARY OF THE INVENTION

It has been recognized that it would be advantageous to develop a technique for the control of individual microscopic optical structures of a MEMS optical device while sharing leads for multiple microscopic optical structures, enabling higher (including sub-pixel) resolution, lower lead count, and flexibility in pixel to microscopic optical structure mapping.

The invention includes a system for singularly controlling individual microscopic optical structures of a MEMS optical device with individual pixel values. The individual pixel values are generated by a pixel source and are to be substantially simultaneously applied to the individual microscopic optical structures. The system comprises a multiplexing circuit, an interconnect, and a demultiplexing circuit. The multiplexing circuit is configured to accept individual pixel values from the pixel value source and create a multiplexed pixel stream which is communicated to the demultiplexing circuit. The demultiplexing circuit is configured to extract the individual pixel values from the multiplexed pixel stream. The individual pixel values may then be substantially simultaneously applied to the individual microscopic optical structures according to a defined mapping.

Another embodiment of the invention includes a controller for providing singular control of individual microscopic optical structures of a MEMS optical device. The controller includes a shared interconnect which is configured to accept a multiplexed stream of individual pixel values and at least one mapper which is configured to extract individual pixel values from the stream and substantially simultaneously apply the individual values to the individual microscopic optical structures according to a configurable mapping.

Another embodiment of the invention includes a driver for providing singular control of individual microscopic optical structures of a MEMS optical device with pixel values for substantially simultaneous application to the individual microscopic optical structures. The driver includes at least one multiplexing circuit which accepts at least two individual pixel values and multiplexes the individual pixel values into a single stream which is communicated to the MEMS optical device via at least one shared interconnect.

Another embodiment of the invention includes a method for singularly controlling microscopic optical structures of a MEMS optical device by sharing a single interconnect for communicating at least two individual pixel value designated for simultaneous application to the microscopic optical structures.

Another embodiment of the invention includes a method for displaying an image with adjustable resolution when modulating a light beam with a MEMS optical devices. The method includes sharing a single interconnect for communicating the pixel values, mapping the individual pixel values to at least one microscopic optical structure, and varying the mapping to provide different display resolutions.

Another embodiment of the invention includes a method for non-linear image mapping. The method includes sharing a single interconnect for communicating the pixel values and mapping the pixel values to at least one microscopic optical structure to create non-uniform pixel sizes to compensate for distortion of the image.

Additional features and advantages of the invention will be apparent from the detailed description which follows, taken in conjunction with the accompanying drawings, which together illustrate, by way of example, features of the invention.

DETAILED DESCRIPTION

Figure 1:
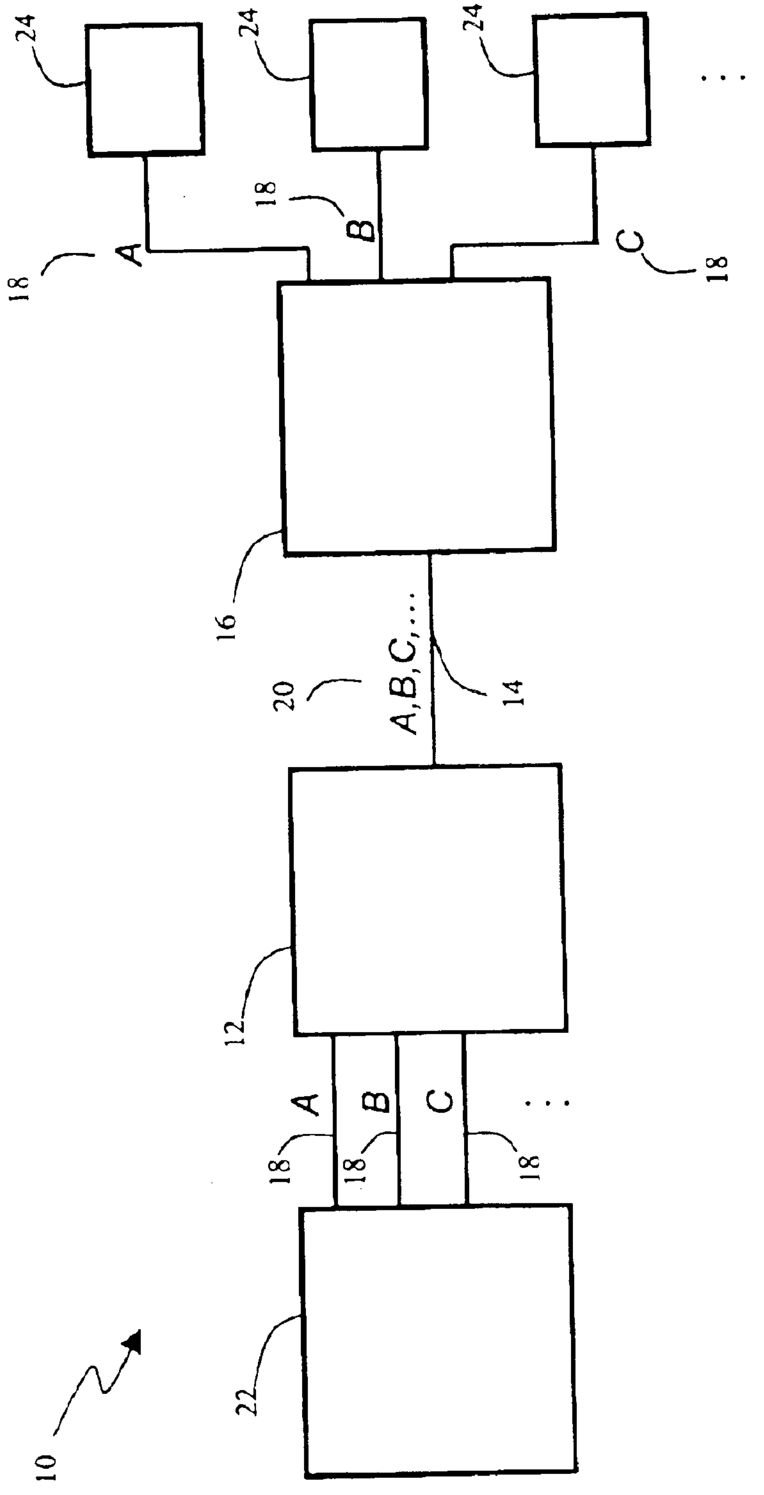
FIG. 1 is a block diagram of an Ultra-High Resolution Light Modulation Control System in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

It is to be understood the term "multiplexing" used herein refers to any technique for combining two distinct electrical signals for communication through an electrical interface. It is also to be understood the term "demultiplexing" used herein refers to any corresponding technique for extracting the distinct electrical signals from a multiplexed signal. It is also to be understood the term "interconnect" refers to any structure for communication of an electrical signal, including, but not limited to, a bond wire of an integrated circuit assembly, a pin on an integrated circuit package, or a trace on a printed circuit board.

As illustrated in FIG. 1, a system for ultra-high resolution light modulation using a MEMS optical device is indicated generally at 10, in accordance with the present invention. The system may include a multiplexing circuit 12, an interconnect 14, and a demultiplexing circuit 16.

Multiplexing circuit 12 is configured to accept at least two pixel values 18 from a pixel value source 22, where the pixel values 18 are to be simultaneously applied to the individual microscopic optical structures 24 of the MEMS optical device (not shown). The pixel value source 22 may be, for example, a display system. In a display system, pixel values 18 represent a column, row, or frame of image information to be displayed by application of the pixel values 18 to the individual microscopic optical structures 24 of the MEMS optical device.

The pixel values 18 may be provided to the multiplexing circuit 12 in a variety of ways. For example, the pixel values 18 may be provided in a parallel format, in a serial format, or using a hybrid of parallel and serial transfer, as discussed further below.

The multiplexing circuit 12 creates a multiplexed stream of pixel values 20 from the pixel values 18. For example, multiplexing circuit 12 may preferably create a multiplexed stream of pixel values 20 by sequentially outputting each pixel value 18. The multiplexed stream of pixel values is communicated via interconnect 14 to demultiplexing circuit 16.

The demultiplexing circuit 16 extracts the individual pixel values 18 from the multiplexed stream of pixel values 20, which may then be applied to the corresponding individual microscopic optical structures 24 of the MEMS optical device. Demultiplexing circuit 16 may preferably be implemented by sampling the multiplexed stream of pixel values 20 at the appropriate times to extract the pixel values 18.

Figure 2:
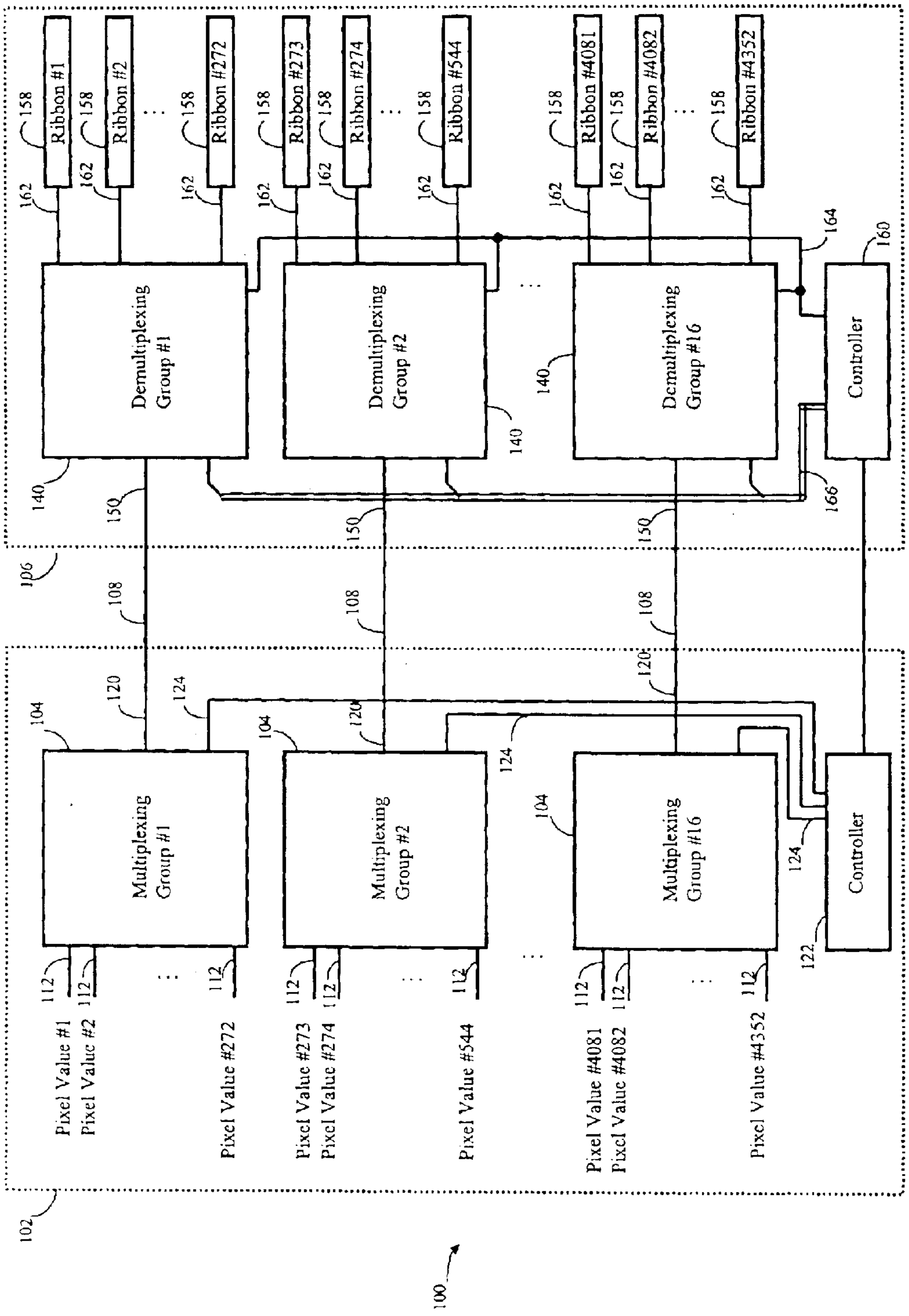
FIG. 2 is a block diagram of an Ultra-High Resolution Light Modulation Control System in accordance with another embodiment of the present invention.

As illustrated in FIG. 2, a system for ultra-high resolution light modulation using a GLV type of MEMS optical device is indicated generally at 100, in accordance with another embodiment of the present invention. The system may include a driver chip 102 and a GLV chip 106 communicating through a plurality of interconnect pins 108. The driver chip 102 may further include a plurality of multiplexing groups 104 for accepting individual pixel values to be displayed 112, which are multiplexed together to produce a plurality of multiplexed analog pixel streams 120, which are communicated to the plurality of interconnect pins 108. The driver chip 102 may further contain a controller 122 connected to the multiplexing groups 104 via multiplexer control 124.

The GLV chip 106 may include a plurality of demultiplexing groups 140. The GLV may further include input busses 150, connecting the demultiplexing groups 140 with interconnect pins 108. The GLV chip may further include a plurality of ribbons 158. The multiplexed analog pixel streams 120, provided by interconnect pins 108 to input busses 150, are processed by demultiplexing groups 140 to produce individual ribbon control voltages 162 which are applied to the ribbons 158. The GLV chip 106 may further include controller 160 that is connected to the demultiplexing groups 140 via a demultiplexing control bus 166 and switch control 164. Fabrication of the demultiplexing groups 140 and controller 160 may be on the same substrate as the microscopic optical structures, e.g. using the technique disclosed in U.S. Pat. No. 5,963,788 issued to Barron et. al. Alternately, the demultiplexing groups 140 and controller 160 may be fabricated on a different substrate than the microscopic optical structures, and the two devices may be combined in a single package, for example using flip chip techniques.

Figure 3:
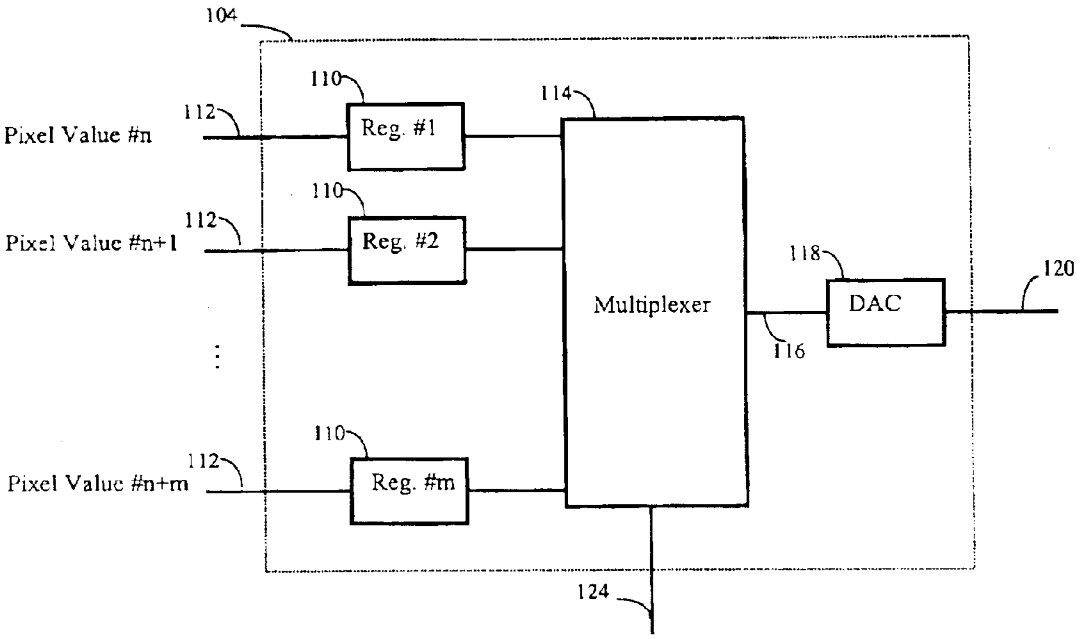
FIG. 3 is a detailed block diagram of the multiplexing group of FIG. 2.

FIG. 3 provides further detail of one particular implementation of the multiplexing groups 104 in accordance with the present invention. A multiplexing group 104 may contain registers 110 for accepting individual pixel values to be displayed 112. A multiplexing group 104 may further include a multiplexer 114 accepting and multiplexing groups of individual pixel values to be displayed 112 from groups of registers 110 to produce a multiplexed pixel stream 116. A multiplexing group 104 may further include an digital to analog converter 118 accepting multiplexed pixel stream 116 from the multiplexer 114 and converting the stream into a multiplexed analog pixel stream 120. The multiplexing order is determined by multiplexer control 124.

Pixel values to be displayed 112 are written into registers 110 by the display system. The pixel values to be displayed 112 may be written to registers 110 one at a time, several at a time, or all at once, depending upon the needs of the display system. For example, the display system could write four pixel values to be displayed 112 at a time into registers 110. Those skilled in the art will recognize that other techniques for communicating the pixel values to be displayed 112 to the driver chip 102 may be used consistent with the present invention. For example, pixel values could be provided by the display system as an already multiplexed stream of data, in which case registers 110 and multiplexer 114 could be eliminated from the multiplexing group 104.

The sequence of pixel values to be displayed 112 that is output from the multiplexer 114 is determined by the controller 122. For example, a 4352-pixel display height may be implemented with sixteen multiplexing groups 104, each multiplexing group 104 containing 272 registers 110. Hence, each multiplexing group 104 may multiplex 272 pixel values to be displayed 112 into a multiplexed pixel stream 116. The sixteen multiplexed pixel streams 116 are then communicated to the GLV via sixteen interconnect pins 108.

Figure 5:
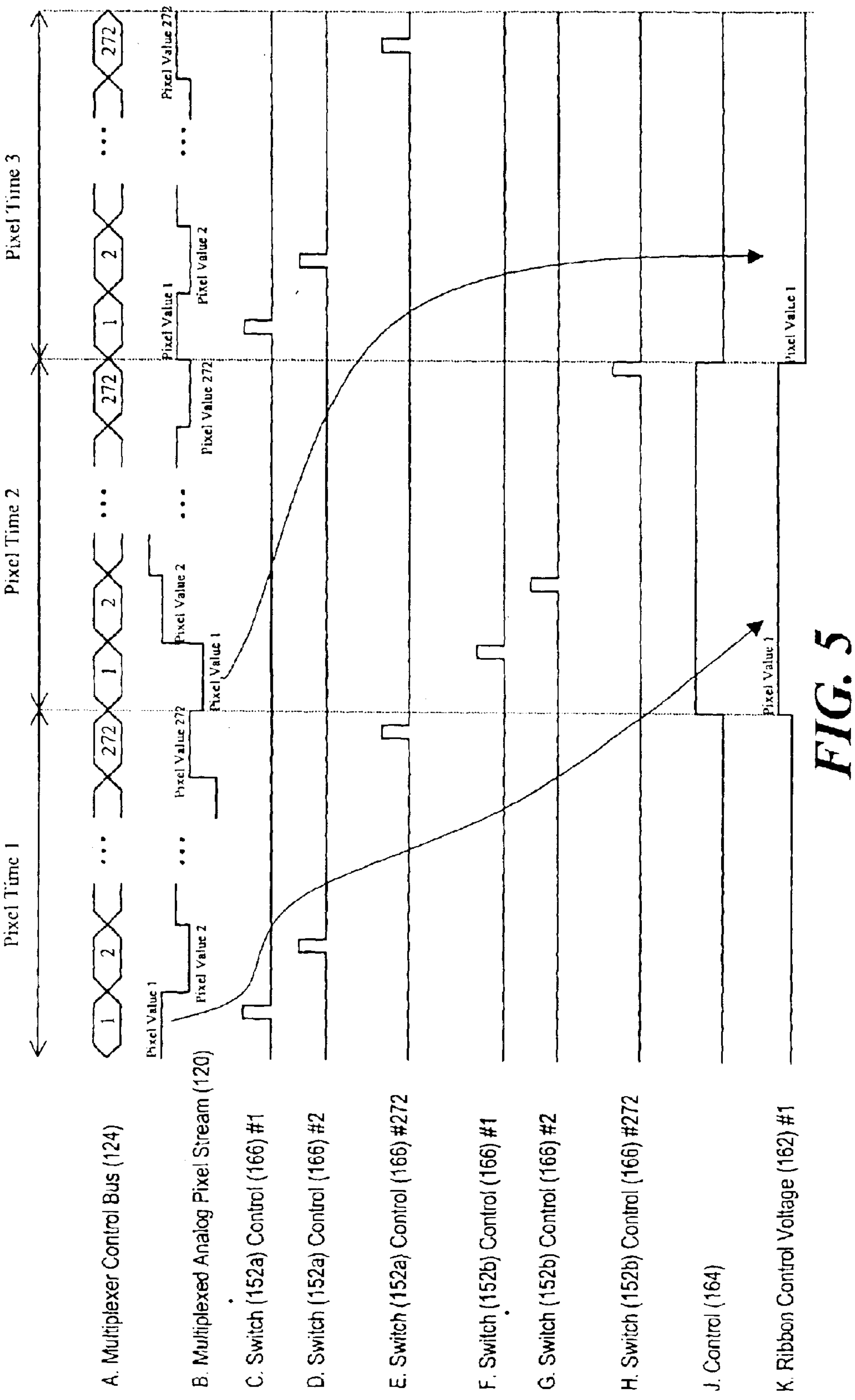
FIG. 5 is a timing diagram of the operation of the Ultra-High Resolution Modulation Control System of FIG. 2.

The multiplexing order is controlled by controller 122 via multiplexer control 124. For example, the first multiplexing group 104 may output pixel 1, 2, 3, etc. up to pixel 272. The second multiplexing group 104 may output pixels 273, 274, 275, etc. up to pixel 544. FIG. 5 provides a timing diagram example for multiplexing operation as just described. Line A of FIG. 5 shows the value of multiplexer control 124, and line B shows the resulting sequence of pixel values output by the multiplexed analog pixel stream 120. Various other combinations of number of groups, pixels per group, and pixel multiplexing order may prove advantageous for a particular display configuration as would be apparent to one skilled in the art.

Figure 4:
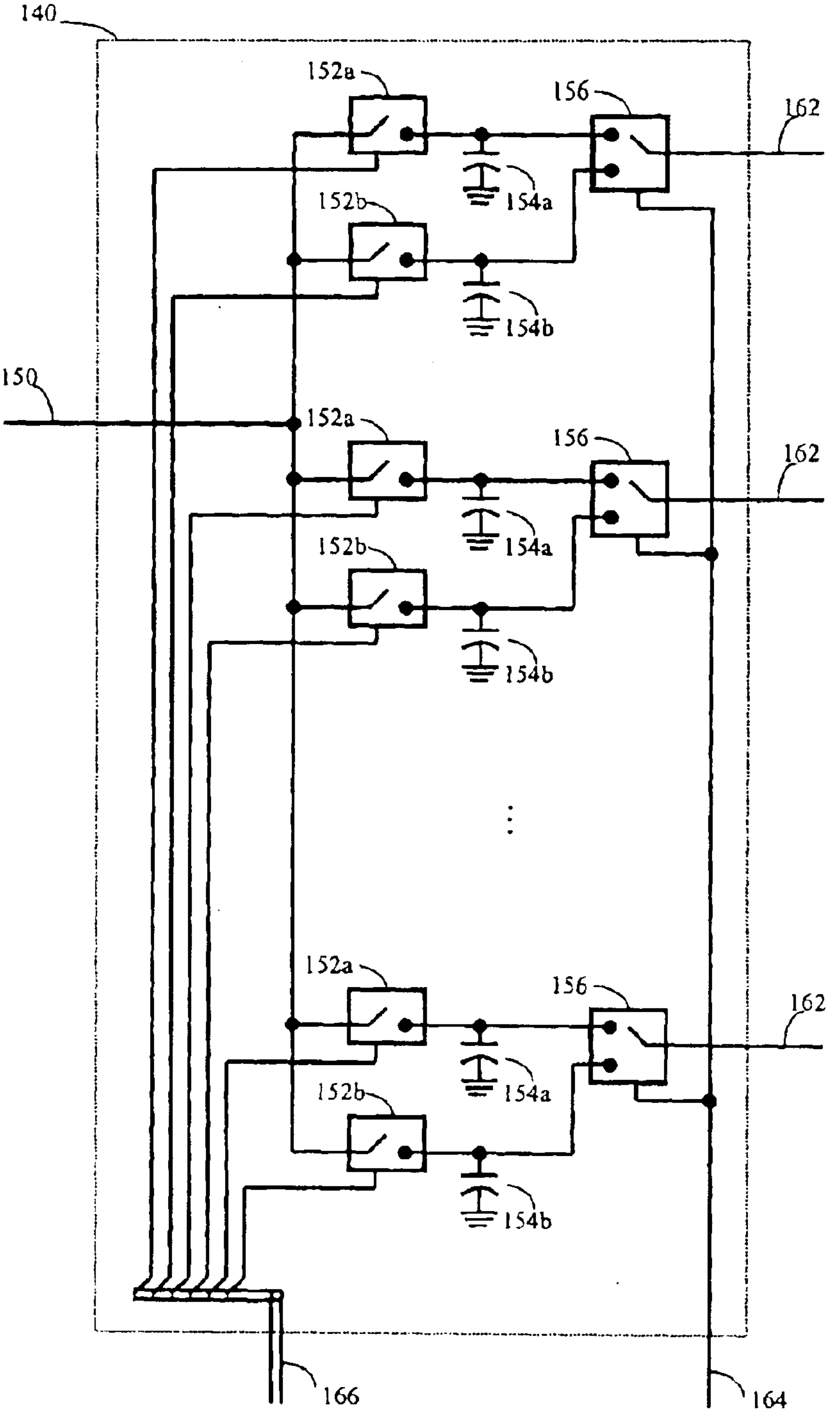
FIG. 4 is a detailed block diagram of the demultiplexing group of FIG. 2.

FIG. 4 provides further detail of one particular implementation of a demultiplexing group 140 in accordance with the present invention. A demultiplexing group 140 may contain switches 152 connected to input bus 150 and controlled by demultiplexer control bus 166. Switches 152 sample the multiplexed analog pixel stream 120 at the time determined by the demultiplexer control bus 166. A demultiplexing group 140 may further include voltage storage elements 154. Although voltage storage elements 154 may be implemented by a capacitor as shown here, those skilled in the art will recognize other that other techniques for storing a voltage may be used consistent with the present invention. By briefly closing switch 152, the voltage on input bus 150 is impressed upon voltage storage element 154 creating a sample and hold. A multiplexing group 140 may further include switch 156 connected to voltage storage elements 154.

The timing for switches 152*a*, 152*b*, and 156 is shown in FIG. 5. For a first pixel time (one vertical column of pixels in a horizontally swept display), controller 160 may sequentially close switches 152*a* at the correct times to impress a particular pixel control voltage onto the storage elements 154*a*. Each switch 152*a* in a demultiplexing group 140 is briefly closed during the time corresponding to one particular pixel as shown in lines C through E of FIG. 5. By ensuring that the controller 160 closes switch 152*a* only when the multiplexed analog pixel stream 120 is stable, crosstalk between pixels is avoided. Once all of the pixel control voltages have been extracted, the controller may then toggle switches 156 using switch control 164 to substantially simultaneously apply the individual pixel voltages held by voltage storage elements 154*a* to the individual ribbons 158 as shown in line J and K of FIG. 5. The individual pixel voltages will be held by voltage storage elements 154*a* for one pixel time, during which time the controller may begin demultiplexing a new set of pixel control voltages using switches 152*b* and voltage storage elements 154*b* as shown in lines F through H of FIG. 5.

Application of individual pixel control voltages to each individual ribbon may prove advantageous in applications requiring very high resolution, since the resolution is defined by a single ribbon. Alternately, every other ribbon may be permanently tied to a bias voltage to create reference ribbons, and the other half controlled through the demultiplexing groups 140. Although this reduces the resolution of the display, it halves the amount of circuitry required in the multiplexing and demultiplexing groups.

Figure 6:
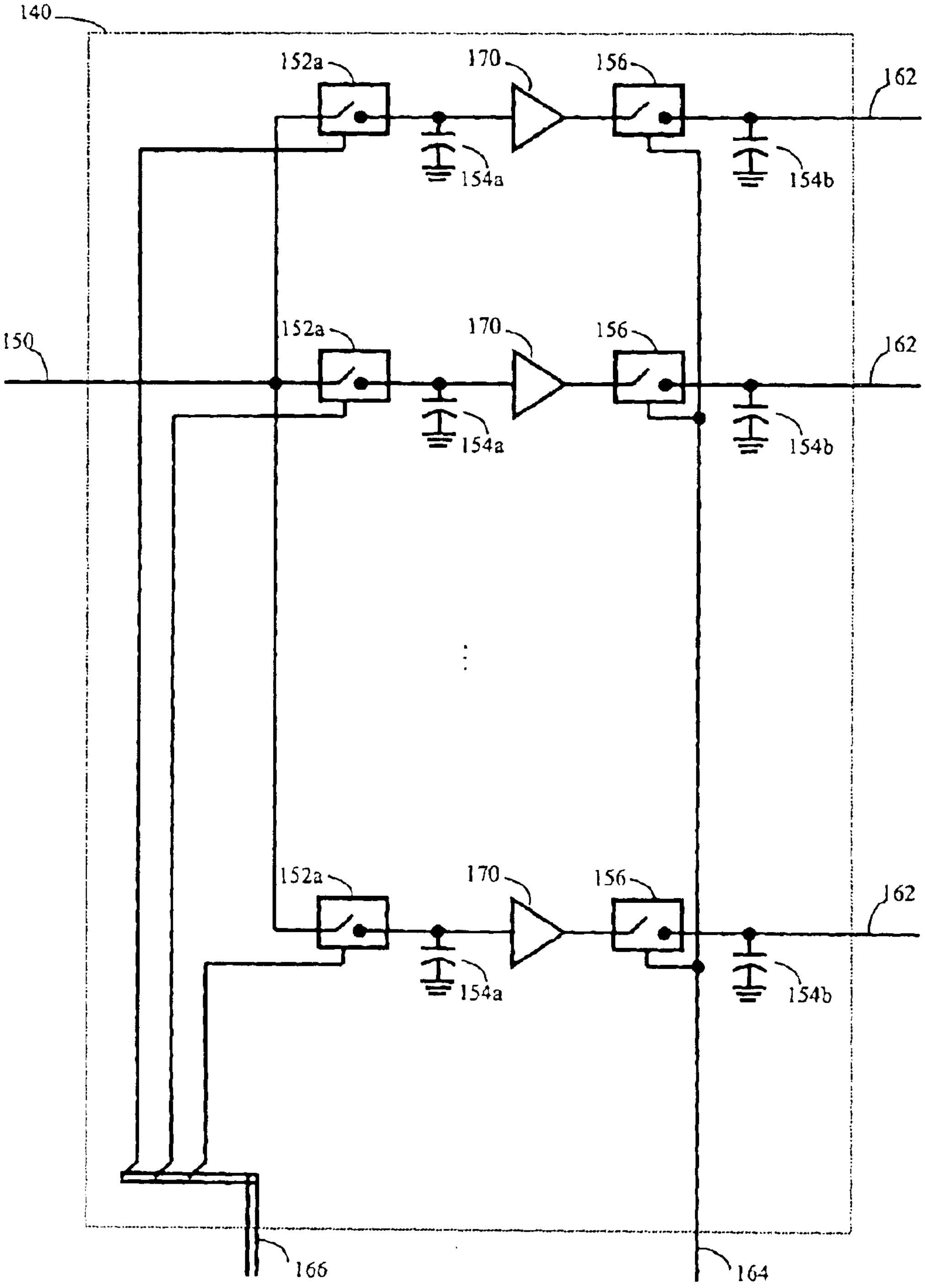
FIG. 6 is a detailed block diagram of an alternate configuration of the demultiplexing group of FIG. 2.

FIG. 6 provides detail of an alternative implementation of a demultiplexing group 140 in accordance with the present invention. A reduction in the number of switches is obtained by the addition of amplifier 170 and elimination of switch 152*b*. While one set of pixel control voltages is being held by voltage storage elements 154*b*, the next set of pixel control voltages can be demultiplexed and stored in voltage storage elements 154*a*. When a complete set of pixels has been demultiplexed, they are transferred to the ribbons 158 and voltage storage elements 154*b* by briefly closing switch 156.

Figure 7:
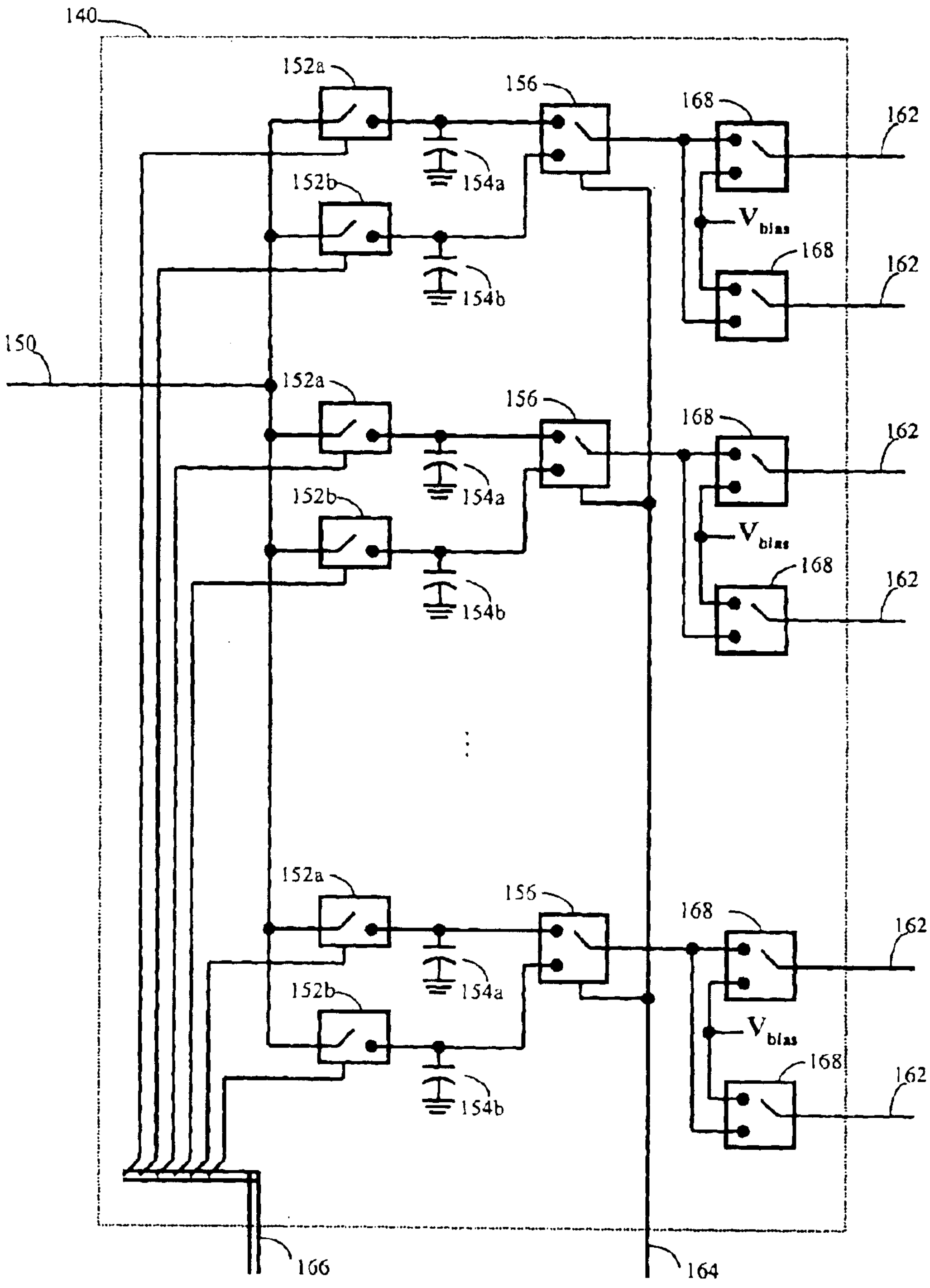
FIG. 7 is a detailed block diagram of yet another alternate configuration of the demultiplexing group of FIG. 2

FIG. 7 provides detail of yet another alternative implementation of a demultiplexing group 140 in accordance with the present invention. Ribbons 158 are connected in pairs (one active, one reference) to the sample and hold represented by switches 152, switches 156, and voltage storage elements 154. The ribbons 158 are connected to the sample and hold by switches 168. Switches 168 control which ribbon is active, while the other ribbon is tied to a bias voltage. This results in a net reduction in the number of switches and voltage storage elements while maintaining single ribbon resolution.

Ribbons 158 might also be grouped differently. For example, even numbered ribbons 158 may be tied to one demultiplexing group 140, and odd numbered ribbons 158 may be tied to a different demultiplexing group 140; such a configuration would be useful to separate high speed control of active ribbons from low speed control of reference ribbons. Furthermore, some ribbons may be updated at a sub-pixel time shorter than the nominal pixel time to provide sub-pixel resolution. Various other similar configurations, including permanently tying multiple ribbons to each individual ribbon control voltage 162, may also prove advantageous as will occur to one skilled in the art.

The mapping of pixel values to be displayed 112 to the ribbons 158 is flexibly controlled. The demultiplexing groups 140 can be commanded by controller 160 to apply any individual pixel value extracted from the multiplexed analog pixel stream 120 any ribbon 158 connected to the multiplexing group 140. Hence, the present invention may be used to provide different display resolutions with a single manufactured configuration of the driver chip 102 and GLV chip 106 by varying the mapping. For example, a 4352-pixel display may also be operated in lower resolution modes providing a 2176 or 1088-pixel display height.

Figure 8:
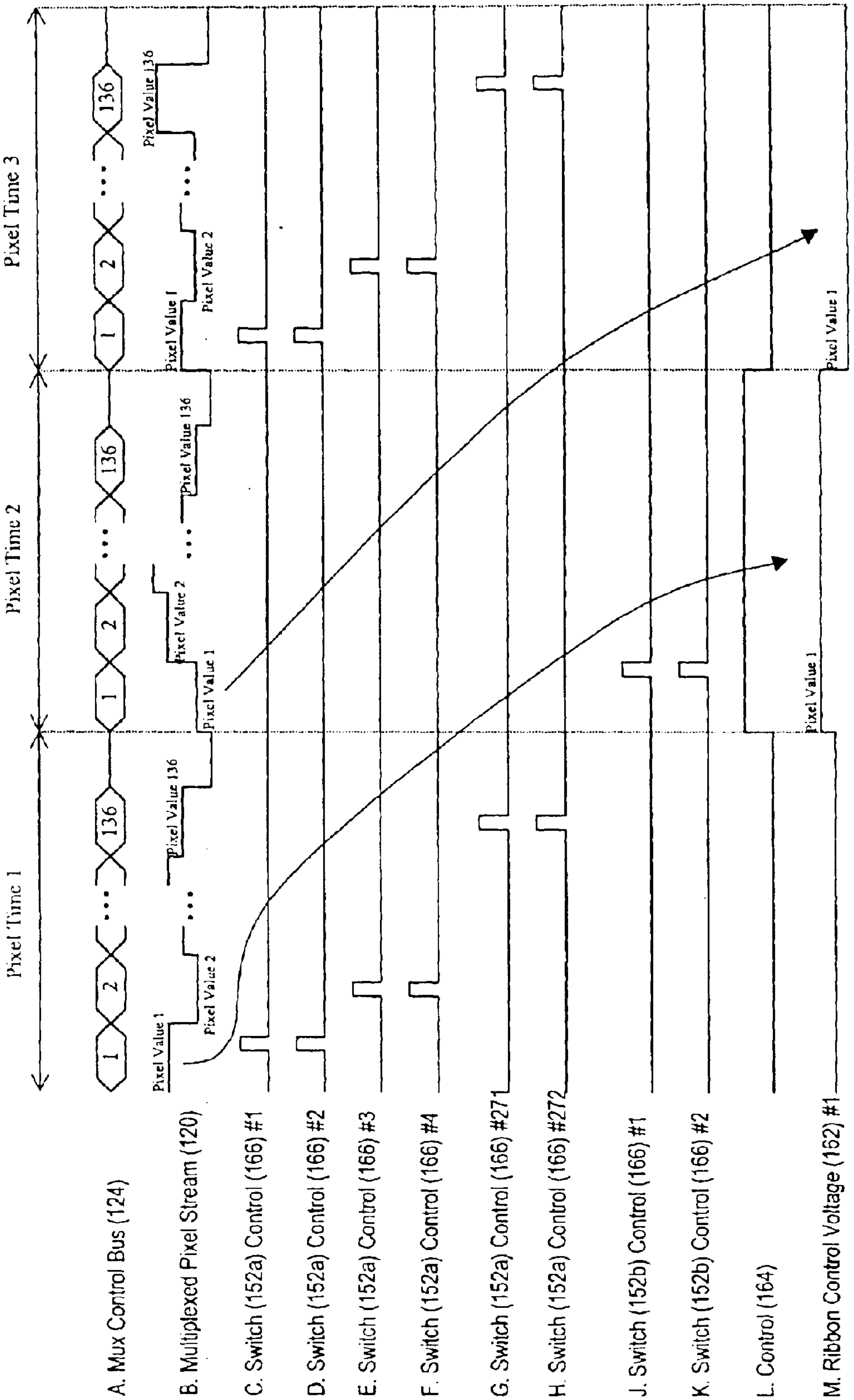
FIG. 8 is a timing diagram of the operation of the Ultra-High Resolution Modulation Control System of FIG. 2 in a reduced resolution mode of operation.

FIG. 8 illustrates a timing diagram for a 2176 pixel resolution mode of operation. The driver chip 102 operates similarly to the 4352-pixel resolution mode discussed previously, sequentially multiplexing groups of pixel values to be displayed 112 to produce a multiplexed analog pixel stream 120 as illustrated in lines A and B. The GLV chip 106 operates differently, however, as the controller 160 closes two switches 152*a* simultaneously for each pixel in order to extract each pixel voltage from the multiplexed analog pixel stream 120 twice as illustrated in lines C though H. Extracted pixel values are then applied substantially simultaneously to the ribbons 158, similarly to the 4352-pixel resolution mode, as illustrated in lines L and M. Operation in the 1088 pixel resolution mode of operation may be accomplished by the controller 160 closing four switches 152*a* simultaneously for each pixel to extract the same pixel voltage for four ribbons 158. A mapping of pixel values to one or more ribbons 158 is therefore accomplished by the timing of how controller 160 closes switches 152. A driver chip 102 and GLV chip 106 pair can therefore implement a variety of resolution modes.

For example, at one extreme, a pixel may be composed of two ribbons, one reference and one active, and ½ pixel resolution provided by swapping the active and reference ribbons. At the other extreme, the entire display may be a single pixel, mapping half the ribbons to the reference and half to active, all of the ribbons being provided the same ribbon control voltage. Furthermore, the mapping of pixels to ribbons may be different for different portions of the array. For example, a display may provide higher resolution in the center where it is most needed and less resolution near the edges. This may be accomplished by mapping pixels at the center of the display to a relatively smaller number of ribbons and mapping pixels near the edges of the display to a relatively larger number of ribbons. Sub-pixel resolution may also be provided by shifting the mapping of pixels to ribbons by a number of ribbons less than the number of ribbons per pixel. Sub-pixel resolution may also be provided by applying new sets of ribbon control voltages 162 at a sub-pixel time shorter than the pixel time.

Figure 9:
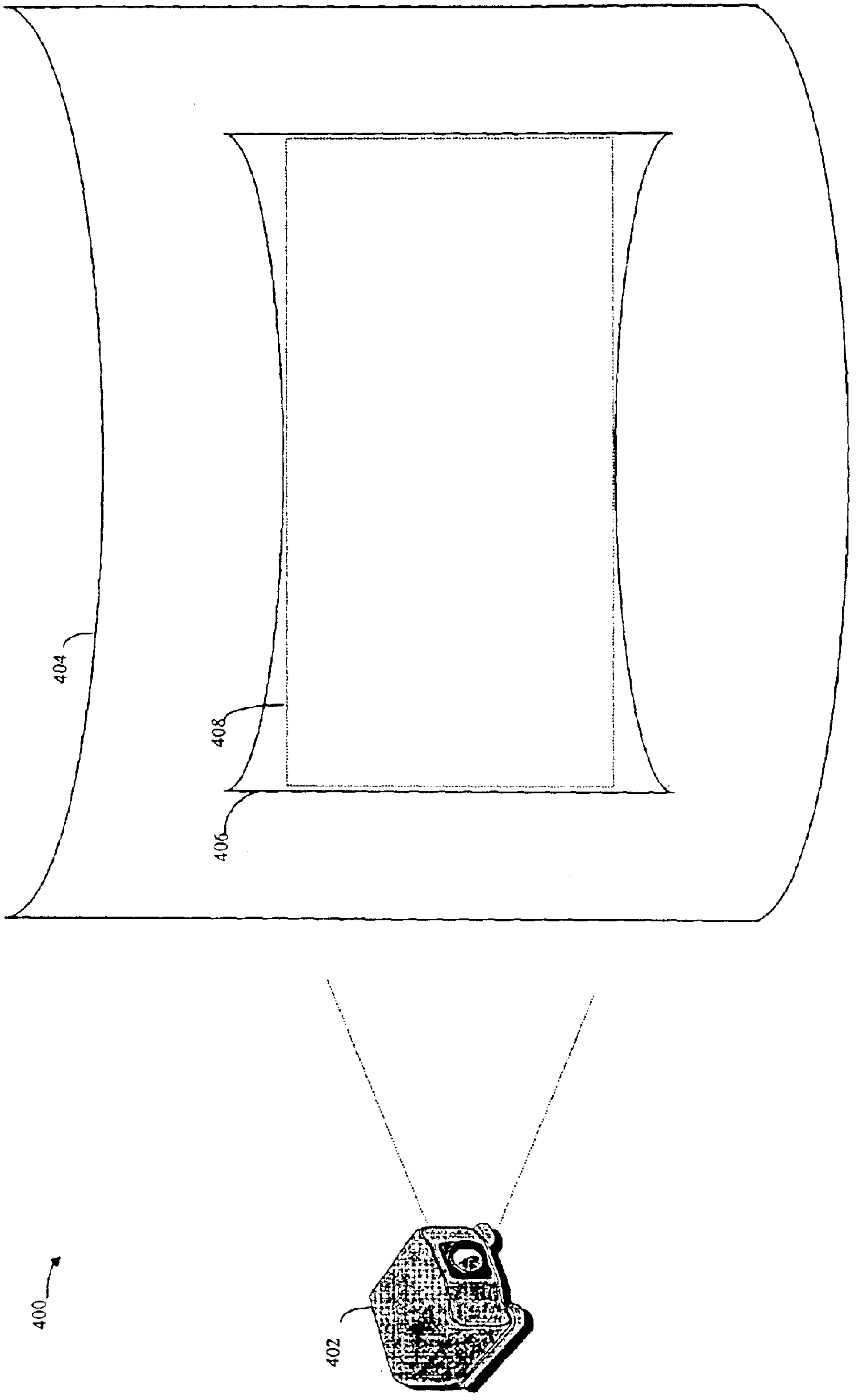
FIG. 9 is a depiction of using the present invention to compensate for image distortion in a projection system

The ultra-high resolution light modulation control system disclosed herein may be used to implement non-linear image mapping. For example, as illustrated in FIG. 9, a projection system using the ultra-high resolution light modulation control system of the present invention is illustrated generally at 400. Projector 402 projects an image onto a cylindrically curved wall 404. If uncompensated for the distortion, the extent of the projected image would be smaller in the center portion of the wall closest the projector, and larger at the edges furthest from the projector as shown by uncompensated image 406. To compensate for this distortion, the mapping of pixels to microscopic optical structures is dynamically varied as the display is swept horizontally across the wall. Starting from one edge, the display uses a portion of the MEMS optical device, mapping each pixel to an appropriate number of microscopic optical structures. As the beam sweeps towards the center, additional microscopic optical structures are used, and each pixel mapped to a larger number of microscopic optical structures, so that when the beam is at the center of the wall, the full MEMS optical device is being used. As the beam sweeps towards the other edge, pixels are mapped to a smaller number of microscopic optical structures, and some microscopic optical structures disused. This appropriately shapes the image while maintaining an identical number of pixels throughout the image, producing the undistorted image 408. The mapping of pixels to microscopic optical structures may be determined entirely by the controller 160, reducing the need for any external computational processing as required by prior art techniques. For example, Table I illustrates a simple example of mapping for a 10 pixel display implemented with a 60 ribbon GLV. For this example, the even-numbered ribbons 2,4,6 . . . 60 are held constant at the reference voltage, and the odd-numbered ribbons 1,3,5 . . . 59 are mapped to pixels to be displayed. The middle column shows the mapping of pixels to ribbons at the extreme edge of the screen, and the rightmost column shows the mapping of pixels to ribbons at the center of the screen.

TABLE I

Pixel to Ribbon Mapping for Non-linear Image Mapping Distortion Correction

| Ribbon | Pixel # Image Edge | Pixel # Image Center |
|---|---|---|
| 1 | unused | 1 |
| 3 | unused | 1 |
| 5 | unused | 1 |
| 7 | unused | 1 |
| 9 | unused | 1 |
| 11 | unused | 2 |
| 13 | unused | 2 |
| 15 | unused | 2 |
| 17 | unused | 2 |
| 19 | unused | 3 |
| 21 | 1 | 3 |
| 23 | 2 | 3 |
| 25 | 3 | 4 |
| 27 | 4 | 4 |

TABLE I-continued

Pixel to Ribbon Mapping for Non-linear Image Mapping Distortion Correction

| Ribbon | Pixel # Image Edge | Pixel # Image Center |
|---|---|---|
| 29 | 5 | 5 |
| 31 | 6 | 6 |
| 33 | 7 | 7 |
| 35 | 8 | 7 |
| 37 | 9 | 8 |
| 39 | 10 | 8 |
| 41 | unused | 8 |
| 43 | unused | 9 |
| 45 | unused | 9 |
| 47 | unused | 9 |
| 49 | unused | 9 |
| 51 | unused | 10 |
| 53 | unused | 10 |
| 55 | unused | 10 |
| 57 | unused | 10 |
| 59 | unused | 10 |

The flexible mapping of the present invention thus avoids the limitation imposed by prior art fixed assignment of microscopic optical structures to pixels. Further advantageous applications of this flexible mapping will occur to one of ordinary skill in the art.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A system for singularly controlling individual microscopic optical structures of a microelectromechanical optical device with individual pixel values generated by a pixel value source for substantially simultaneous application to the individual microscopic optical structures, comprising:

a) a multiplexing circuit, configured to accept a plurality of individual pixel values from the pixel value source and generate a multiplexed pixel stream;

b) an interconnect, coupled to the multiplexing circuit and configured for accepting the multiplexed pixel stream; and c) a demultiplexing circuit, coupled to the interconnect and configured to receive the multiplexed pixel stream and extract the individual pixel values from the single stream to produce extracted pixel values for substantially simultaneous application to the individual microscopic optical structures according to a defined mapping of pixel values to individual microscopic optical structures.

2. The system of claim 1, further comprising a controller, communicating with said at least one demultiplexing circuit, said controller configured to vary the defined mapping of individual pixel values to individual microscopic optical structures.

3. The system of claim 1, wherein the microelectromechanical optical device is a grating light valve and the individual microscopic optical structures are ribbons of the grating light valve.

4. A microscopic optical structure controller for providing singular control of individual microscopic optical structures of a microelectromechanical optical device by a multiplexed stream of individual pixel values generated by a pixel value source, comprising:

a) at least one interconnect coupled to the pixel value source and configured for receiving the multiplexed stream of individual pixel values; and b) at least one mapper communicating with said at least one interconnect, said mapper communicating with the individual microscopic optical structures, said mapper configured to extract individual pixel values from the multiplexed stream of individual pixel values to produce extracted individual pixel values, and said mapper configured to apply the extracted individual pixel values substantially simultaneously to one or more individual microscopic optical structures according to a configurable mapping.

5. The microscopic optical structure controller of claim 4, wherein said microscopic optical structure controller is configured to communicate with only a portion of the microscopic optical structures of the microelectromechanical optical device.

6. A microscopic optical structure controller for providing singular control of individual microscopic optical structures of a microelectromechanical optical device by a multiplexed stream of individual pixel values, comprising a plurality of sample and holds, each of said sample and holds in communication with an individual microscopic optical structure where each one of said sample and holds samples the multiplexed stream of individual pixel values at the time corresponding to the individual pixel value corresponding to the individual microscopic optical structure.

7. The microscopic optical structure controller of claim 6, further comprising a controller communicating with said plurality of sample and holds and configured to control the time of sampling of each one of said plurality of sample and holds.

8. The microscopic optical structure controller of claim 4 or claim 6, wherein the microelectromechanical optical device is a grating light valve and the microscopic optical structures are ribbons.

9. A driver for providing singular control of individual microscopic optical structures of a microelectromechanical optical device by individual pixel values generated by a pixel source for substantially simultaneous application to the individual microscopic optical structures, said driver comprising:

a) at least one multiplexing circuit communicating with the pixel source and configured to accept at least two of the pixel values from the pixel source and configured to multiplex the individual pixel values into a single stream of multiplexed individual pixel values; and b) at least one interconnect coupled to said multiplexing circuit and configured to accept the single stream of multiplexed individual pixel values and communicate the single stream of multiplexed individual pixel values to the microelectromechanical optical device.

10. The driver of claim 9, wherein the microelectromechanical optical device is a grating light valve and the microscopic optical structures are ribbons.

11. A method for singularly controlling individual microscopic optical structures of a microelectromechanical optical device, comprising the step of sharing a single interconnect for independently communicating at least two individual pixel values to the individual microscopic optical structures of the microelectromechanical optical device where the individual pixel values are for substantially simultaneous application to the individual microscopic optical structures.

12. A method in accordance with claim 11, further comprising the step of substantially simultaneously applying the at least two individual pixel values to at least two corresponding microscopic optical structures according to a selected mapping of individual pixel values to individual microscopic optical structures.

13. A method in accordance with claim 12, further comprising the step of changing dynamically the mapping of individual pixel values to individual microscopic optical structures.

14. A method in accordance with claim 13, wherein said step of changing dynamically the mapping of individual pixel values to individual microscopic optical structures comprises varying the number of individual microscopic optical structures to which each of the individual pixel values is applied to one, two, three, or four individual microscopic optical structures.

15. A method in accordance with claim 13, wherein said step of changing dynamically the mapping of individual pixel values to individual microscopic optical structures comprises varying the number of individual microscopic optical structures to which each of the individual pixel values is applied at a predefined interval.

16. A method in accordance with claim 15, wherein the predefined interval corresponds to a pixel time.

17. A method in accordance with claim 15, wherein the predefined interval corresponds to a sub-pixel time.

18. A method in accordance with claim 11, wherein the individual pixel value is an analog gray scale pixel voltage.

19. A method in accordance with claim 11, wherein the individual pixel value is a digital on-off pixel voltage.

20. A method in accordance with claim 11, wherein said step of sharing a single interconnect for communicating at least two individual pixel values to a microelectromechanical optical device comprises:

a) accepting the plurality of pixel values;

b) grouping at least one subset of the plurality of pixel values to form at least one group of pixel values;

c) multiplexing together the at least one group of pixel values to produce at least one multiplexed pixel stream;

d) converting the at least one multiplexed pixel stream to at least one multiplexed analog signal;

e) communicating the at least one multiplexed analog signal to the microelectromechanical optical device via the at least one interconnect;

f) demultiplexing the at least one multiplexed analog signal to produce a plurality of pixel voltages, whereby each of the plurality of pixel voltages corresponds to a particular one of the plurality of pixel values; and g) applying each of the plurality of pixel voltages to the at least one individual microscopic optical structure.

21. A method in accordance with claim 20, wherein said step of multiplexing together the at least one group of pixel values to produce at least one multiplexed pixel stream comprises outputting each of the pixel values from the groups of pixel values sequentially in time so that each pixel value is output for a substantially equal predefined interval of time.

22. A method in accordance with claim 21, wherein said step of demultiplexing the multiplexed analog signal to produce a plurality of pixel voltages comprises:

a) sampling the multiplexed analog signal at a predefined time interval to extract a group of pixel voltages corresponding to said group of pixel values; and b) holding said group of pixel values for a pixel time.

23. A method for singularly applying individual pixel values for substantially simultaneous application to individual microscopic optical structures of a microelectromechanical optical device, comprising the step of independently communicating at least two of the individual pixel values for substantially simultaneous application to individual microscopic optical structures of the microelectromechanical optical device via a single interconnect.

24. A method in accordance with claim 23, further comprising the step of distributing the individual pixel values to the corresponding individual microscopic optical structures.

25. A method in accordance with claim 24, further comprising the step of mapping the individual pixel values to one or more individual microscopic optical structures.

26. A method in accordance with claim 25, further comprising the step of varying the mapping of individual pixel values.

27. A method for singularly controlling individual microscopic optical structures of a microelectromechanical optical device with individual pixel values designated for substantially simultaneous application to the individual microscopic optical structures through a single interconnect, comprising the step of multiplexing a stream of at least two of the individual pixel values for simultaneous application to the individual microscopic optical structures to create a single multiplexed stream of pixel values for delivery to the microelectromechanical optical device via the single interconnect.

28. The method of claim 11, 23, or 27, wherein the microelectromechanical optical device is a grating light valve and the microscopic optical structures are ribbons.

29. A method for displaying an image with adjustable resolution by modulating a light beam with a microelectromechanical optical device, comprising the steps of:

a) sharing a single interconnect for communication of at least two individual pixel values to the microelectromechanical optical device;

b) mapping individual pixel values to at least one microscopic optical structure of the microelectromechanical optical device; and c) varying said mapping whereby different display resolutions are provided.

30. A method for non-linear image mapping when modulating a light beam with a microelectromechanical optical device, comprising the steps of:

a) sharing a single interconnect for communication of at least two individual pixel values to the microelectromechanical optical device; and b) mapping the individual pixel values to variable numbers of microscopic optical structures to create non-uniform pixel sizes that compensate for distortion of the image.

31. A method in accordance with claim 30, further comprising the step of adjusting said mapping over time to compensate for changing pixel size with time.

* * * * *